(12) United States Patent
Atoyan

(10) Patent No.: US 8,582,869 B2
(45) Date of Patent: Nov. 12, 2013

(54) FINITE DATASET INTERPOLATION METHOD

(75) Inventor: Armen Atoyan, Westmount (CA)

(73) Assignee: Concordia University, Montreal, QC (CA)

(*) Notice: Subject to any disclaimer, the term of this patent is extended or adjusted under 35 U.S.C. 154(b) by 0 days.

(21) Appl. No.: 13/353,804

(22) Filed: Jan. 19, 2012

(65) Prior Publication Data

US 2012/0121167 A1    May 17, 2012

Related U.S. Application Data

(63) Continuation of application No. PCT/CA2010/001104, filed on Jul. 19, 2010.

(60) Provisional application No. 61/226,813, filed on Jul. 20, 2009.

(51) Int. Cl.
*G06K 9/00* (2006.01)

(52) U.S. Cl.
USPC ............................................... 382/154

(58) Field of Classification Search
USPC ......... 382/232, 248, 250, 254, 258, 276–277; 348/395.1; 375/240.318, 240.2; 708/400–405
See application file for complete search history.

(56) References Cited

U.S. PATENT DOCUMENTS 5,168,375 A    12/1992  Reisch
7,787,754 B2 *  8/2010  Patera et al. .................. 386/212

FOREIGN PATENT DOCUMENTS

CA      2171335 A1    6/1995
WO      WO 98/58328 A1  12/1998
WO      WO 2011009196 A1 *  1/2011  .............. G06F 17/17

OTHER PUBLICATIONS

A. Atoyan, J. Patera, "Properties of Continuous Fourier Extension of the Discrete Cosine Transform and its Multidimensional Generalization", Journal of Mathematical Physics, vol. 45 (2004), pp. 2468-2491.*

Armen M. Atoyan, Jiri Patera, "Continuous Extension of the Discrete Cosine Transform, and Its Applications to Data Processing", Centre de Recherche Mathematiques, vol. 39 (2004), pp. 1-15.*

(Continued)

*Primary Examiner* — Jose Couso
(74) *Attorney, Agent, or Firm* — Anglehart et al.

(57) ABSTRACT

The invention provides a fast method for a high-quality interpolation of a finite multidimensional dataset. It has particular application in digital image processing, including, but not limited to, processing of both still images and real-time image/data processing. The method uses discrete cosine and sine transforms of appropriate types to covert, in blocks of desired size, the initial dataset to the frequency domain. Proposed interpolators calculate a chain of inverse transforms of non-square sizes that perform the interpolation. The larger transform is broken into smaller transforms of non-square size using a recursive size reduction process of FFT-type, and the smaller transforms are calculated directly exploiting the symmetry properties of smaller interpolator functions involved. An output dataset is then assembled using the calculated transforms. The method avoids computationally costly process of inflating the coefficient space by padding zeros exploited for DCT-based interpolations previously.

14 Claims, 4 Drawing Sheets

(56) References Cited

OTHER PUBLICATIONS

A. Akhperjanian et al. 2005, Application of multi-dimensional discrete transforms on Lie groups for image processing, in E. Shahbazian, G. Rogova, P. Valin (eds.) "Data Fusion for Situation Monitoring, Incident Detection, Alert and Response Management", ISO Press, Amsterdam, 2005 in press (Proc. NATO ASI-03, Tsakhkadzor, Armenia, Aug. 18-29, 2003).*

Agbinya, J I, Interpolation using the discrete cosine transform, Electronics letters, vol. 28 No. 20, pp. 1927-1928, 1992.

Atoyan, A. et al., Properties of continuous Fourier extension of the discrete cosine transform and its multidimensional generalization, Journal of Mathematical Physics, vol. 45 Issue 6, pp. 2468-2491, 2004.

Hsu, Y F. et al., Rational interpolation by extendible inverse discrete cosine transform, Electronics letters, vol. 33 No. 21, pp. 1774-1175, 1997.

PCT/CA2010/001104 International preliminary report.

PCT/CA2010/001104 International search report.

PCT/CA2010/001104 Written Opinion.

Yeonsik, J. et al., A Fast Algorithm suitable for DCT implementation with integer multiplication, IEEE TENCON 1996. Nov. 26-29, 1996, vol. 2 pp. 784-787.

* cited by examiner

FINITE DATASET INTERPOLATION METHOD

This application is a continuation of PCT/CA2010/001104 filed on Jul. 19, 2010 which is a non-provisional of U.S. provisional patent application 61/226,813 filed on Jul. 20, 2009, now abandoned, the specification of which is hereby incorporated by reference.

BACKGROUND

Manipulation of digital information organized in multidimensional finite (discrete) datasets has widespread practical applications, such as in the processing of digital two-dimensional and three-dimensional images, videostream manipulations, computer vision, data compression, and the like. Much of this dataset processing relies on mathematical transformations to achieve a desired practical change in the functional aspects of the dataset, such as the resolution of a digital image, image rotation and/or warping, the format of the image representation and storage. An example of such a transformation is the Discrete Cosine Transform (DCT), introduced in 1974 and classified into 4 basic types in 1984, which has proven to be very efficient for a large number of data processing applications. Currently the most popular version of DCT is the DCT-II implemented in the data compression standard JPEG. Earlier some versions of DCT have been also proposed for discrete interpolation, such as the modified versions of DCT-I and DCT-II. Although so far these interpolation methods have not been as popular as linear and higher-order interpolation algorithms, we believe that interpolations based on trigonometric polynomials (including cosine and sine transforms) will gain significant practical ground in the near future. This relates to interpolations by both the DCT and the continuous extensions of DCT, or CEDCT. The CEDCT has been recently derived (2004) as the one-dimensional implementation of a broad class of multidimensional discrete transforms which are based on orbit functions of compact semisimple Lie groups of various symmetries.

An important feature of the DCT-I is that it is well suited (better than other DCT and Discrete Sine Transform (DST) types) for discrete data interpolation. It can be naturally extended to form a continuous trigonometric polynomial called CEDCT. For a (N+1)-pixel data set $\{f_n\}_{n=0}^N$ which results from sampling of a function f(x) on the equidistant N-interval grid $\{x_n\}_{n=0}^N$, the CEDCT function $F_N(x)$ returns the values of f(x) at the grid points $x=x_n$. Between the grid points F(x) provides an approximation to f(x) that has a number of useful analytic properties, including convergence to the continuous sampling function f(x), localization, and differentiability, i.e., $F'_N \to f'(x)$ if $N \to \infty$. Because of these properties, the CEDCT provides image interpolation quality that is quite comparable with, and could even exceed, the quality of bicubic and other high-order non-adaptive interpolation algorithms. However, as with earlier data processing transformations, the CEDCT has limits in its efficiency if the zooming is done to a non-integer zooming factor m. For an integer zooming factor the CEDCT is reduced to known method of interpolation by the DCT-1 with zero-padding, the computational efficiency of which was possible to enhance using a standard fast cosine transform (FCT) algorithm.

SUMMARY

In accordance with the present invention, a data processing method is provided that allows for the fast interpolation, or resizing, of a given discrete input dataset $\{f_n\}$ stored in a digital memory. The dataset may represent multidimensional digital image data defined on an equidistant N-interval grid of pixels, and the interpolation may be a mapping onto another equidistant grid having a pixel density m times higher. The method may include subdividing an initial dataset into blocks of N-interval datasets $\{f_n\}_{n=0}^N$, which may be of radix-2 length $N=2^r$. The input dataset is then transformed into the frequency domain to obtain a set of coefficients $C=\{a_k\}_{k=0}^N$ of a discrete trigonometric transform of a selected type appropriate for further interpolation by its inverse. Examples of such transform types include DCT-I, DCT-II, DCT-III, DST-I, DST-II and DST-Ill. The transform type to be used for interpolation may be selected and others derived as necessary.

After obtaining the set of transform coefficients, an inverse transform, such as an inverse DCT on the new grid with $M=m \times N$ subintervals, is performed to calculate an interpolated data set $F_n = \sum_{k=0}^N A(n,k) a_k$, where $n=0, 1, \ldots M$, and $A(n,k)$ is a non-square matrix of size $M \times N$. This procedure includes reducing recursively the calculation of the transform to a chain of smaller transforms of size $(M/2) \times (N/2)$, until one of the non-square matrix sizes $(2m \times 2)$ is reached. The smaller transforms are then calculated directly; and an output dataset is assembled from the results of the calculated smaller transforms. If desired, similar recursive calculations can also be performed with the blocks of modified radix-2 length $N=q \times 2^r$, where q is, in general case, one of the integers 2, 3, or 4. In this case the smallest transform, to be calculated directly, is of size (qm×q).

The recursive reduction step may include a splitting of the initial set $\{a_k\}_{k=0}^N$ into even and odd k-index subsets, $\{e_k \equiv a_{2k}\}_{k=0}^{N_1}$ and $\{o_k \equiv a_{2k+1}\}_{k=0}^{N_1}$ where $N_1=N/2$. The calculation of the transforms may include the application of at least one of the interpolators:

$$C_m^I(p; a_k) = \sum_{k=0}^N a_k \cos \frac{\pi p k}{M}$$

$$C_{m,N}^{II}(p; a_k) = \sum_{k=0}^{N-1} a_k \cos \frac{\pi(2k+1)p}{2M}$$

$$S_{m,N}^I(p; a_k) = \sum_{k=1}^{N-1} a_k \sin \frac{\pi k p}{M}$$

and $$S_{m,N}^{II}(p; a_k) = \sum_{k=0}^{N-1} a_k \sin \frac{\pi(2k+1)p}{2M}$$

where $p=0, 1, \ldots M$. This calculation step may also include the application of at least one of the flipping symmetry properties $$C_{m,q}^I(qm-p; a_k) \leftrightarrow C_{m,q}^I(p; a_k)$$

$$C_{m,q}^{II}(qm-p; a_k) \leftrightarrow C_{m,q}^{II}(p; a_k)$$

$$S_{m,q}^I(qm-p; a_k) \leftrightarrow S_{m,q}^I(p; a_k),$$

and $$S_{m,q}^{II}(qm-p; a_k) \leftrightarrow S_{m,q}^{II}(p; a_k)$$

for the transforms of the small size after size reduction to reduce the number of necessary processing steps. Interpolation of data sets of more than one dimension is done by applying the method successively in the direction of each dimension. An output dataset is assembled from the results of the calculated small transforms.

The use of the present method provides a more efficient (fast) conversion of the input dataset to an interpolated or resized dataset. This method may be implemented in a variety of physical transformations, such as the resizing, or zooming, of a digital image, still multidimensional imaging, video stream processing or computer vision. The grid of data representative of a digital image may thus be quickly resized in a digital camera or image processing environment to provide a more computationally cost-efficient data interpolation technology than has been previously available.

DETAILED DESCRIPTION

Figure 1:
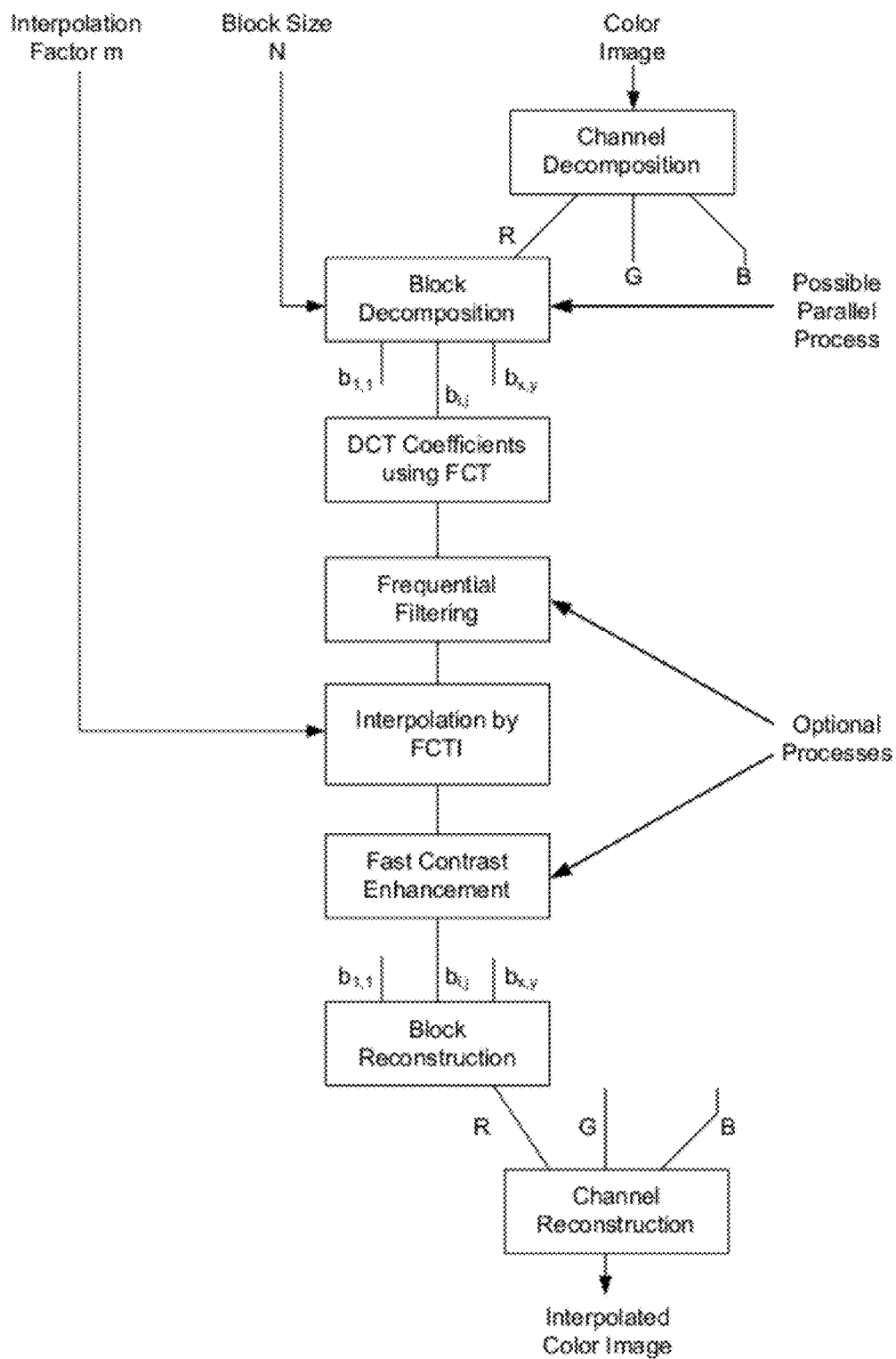
FIG. 1 is a block diagram showing the steps associated with one type of image interpolation.

In an exemplary embodiment of the invention, a system and method produce faster and more efficient interpolation and resizing of finite data sets using a process referred to herein as a fast cosine transform interpolation (FCTI). This system may be applied to various data processing applications, a notable one being the processing of digital image data. An example is the changing of the resolution of a digital image while maintaining image integrity. In many cases this will require interpolation of the data point in the image dataset. Examples of possible applications include image zooming, image rotation and/or warping, computer vision systems, Computed Tomography, Magnetic Resonance Imaging, and the like. FIG. 1 is a block diagram showing an image resizing/interpolation method for a color digital image. The method involves the following steps: (1) decomposition of the original image into RGB color channels (standard); (2) decomposition each color channel into blocks of a chosen size N overlapping at least by one pixel (the order of these first two steps can be reversed if so desired); (3) Transforming each block of the original data into frequency domain by calculating the DCT (or DST) coefficients using FCT (or FST); (4) Fast filtering the data by modifying the transform coefficients in the frequency domain (optional); (5) Calculation of the inverse transform to find the block of image interpolated/resized to size M=m×N, using the FCTI method; (6) Contrast enhancement of the interpolated image block (optional; may increase the peak signal-to-noise ratio of the filtered image by 1-2 dB); (7) Assembly/reconstruction of the interpolated image blocks; (8) Color channel reconstruction finalizing the interpolation procedure. The steps from (3) to (7) inclusively can be done in parallel processing if so desired.

Figure 2:
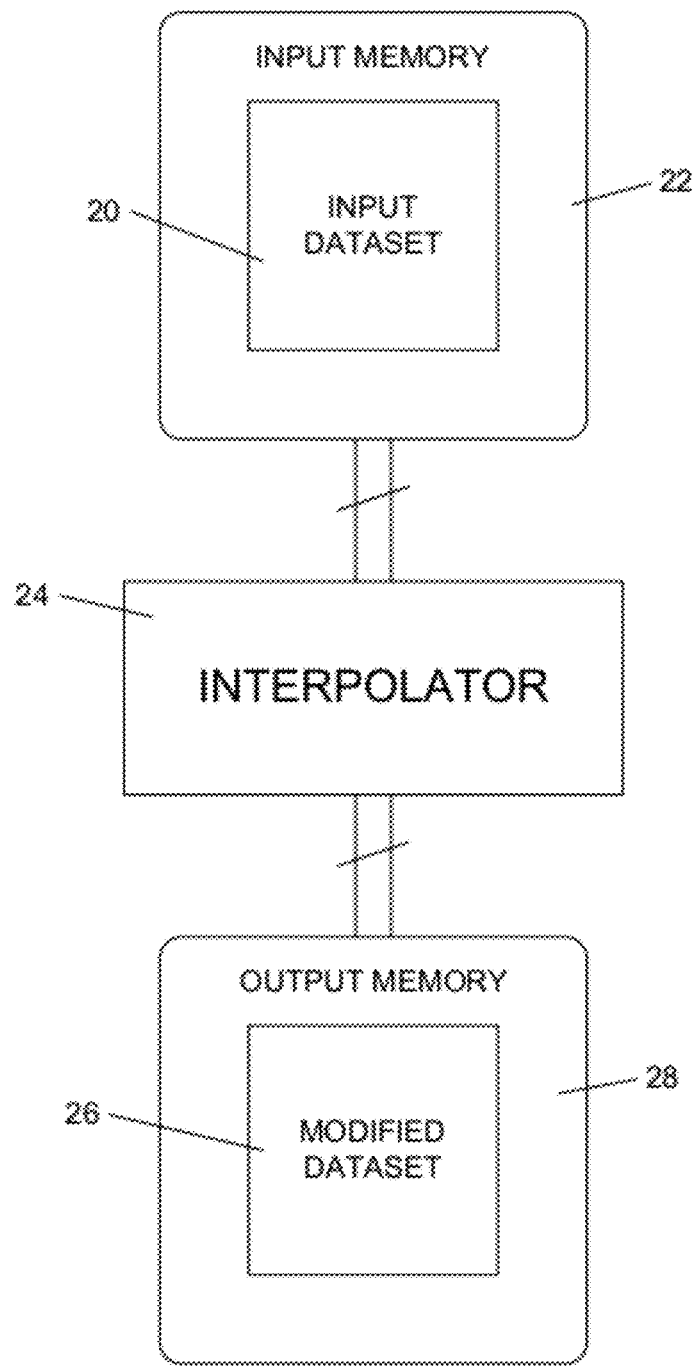
FIG. 2 is a schematic view of a general configuration of the invention.

While imaging, i.e. digital image processing, is a particularly notable application for the present invention, it may be applied to many other areas of general data processing in which fast interpolation or resizing of an initial dataset is desired. FIG. 2 depicts schematically a more general embodiment of the invention. An input dataset 20 is transformed into frequency domain, filtered, compressed in the frequency domain if desired, and stored in a first digital memory location 22. This dataset of the transform coefficients is then either accessed later on by the interpolator 24 whenever needed, or for real-time telecommunication applications, is transferred immediately into another location, where the interpolator 24 is located. The interpolator implements the data interpolation techniques described herein and completes the steps in FIG. 1, as appropriate. Those skilled in the art will understand that, although shown separately in FIG. 2, the interpolator 24 also may be part of the same system as the first memory 22, e.g., part of a single computer. The modified dataset 26 is then output to an output memory 28 to be accessed as desired by an appropriate application. Again, it will be understood that the output memory may be part of either the same or a different system as the interpolator.

The efficiency (computational cost) advantage of the invention may be expressed in terms of floating point operations ("flops") per interpolation point, which is a common measure that defines the required processing time. As discussed in more detail below, the number of flops necessary for performing a given data processing operation, such as the interpolation of a data set, is significantly lower using the present invention than with conventional technologies based on the common Fast Fourier Transform ("FFT") or Fast Cosine Transform ("FCT") technique, which use the zero padding method to complete the square transform matrices.

The present embodiment is directed to interpolation of one-dimensional data sets, K=1. Interpolation of multidimensional data, K>1, is reduced to a sequence of independent 1-D interpolations in each of the K basis vector directions. Different zooming factors can be chosen for each direction if necessary. As an example, one may consider a one-dimensional data set of length (N+1) pixels, i.e., $\{f_n\}_{n=0}^N$. The (modified) discrete cosine transform of type I, i.e. DCT-I, of $\{f_n\}$ is given by:

$$a_k = \sum_{n=0}^{N} \frac{2c_{N,n}c_{n,k}}{N} f_n \cos\frac{\pi nk}{N}, k = 0, \ldots, N \quad (1)$$

Where $$c_{N,n} = \begin{cases} \frac{1}{2} & \text{for } n = 0, N \\ 1 & \text{otherwise} \end{cases} \quad (2)$$

The inverse transform is given by:

$$f_n = \sum_{k=0}^{N} a_k \cos\frac{\pi kn}{N} \quad (3)$$

The transform given by the equations (1)-(3) can be brought to the (standard) orthogonal form by renormalizing the coefficients $a_k$. However, the transform given by equation (1) appears more convenient for data interpolation, both discrete or continuous. In particular, the inverse transform (3) is easily generalized into a continuous trigonometric polynomial function by replacing $$\frac{n}{N} = x \in [0, 1],$$

$$F_N(x) = \sum_{k=0}^{N} a_k \cos(\pi kx). \quad (5)$$

The function $F_N(x)$ is a natural continuous extension of the inverse DCT (abbreviated CEDCT). Obviously, $F_N(x)=f_i$ at the grid points $\{x_i=i/N\}_{i=0}^N$. For any other $x\in[0,1]$ the function $F_N(x)$ provides an interpolation that approximates well the original sampling function f(x). However, for an arbitrary value of x the computational cost of CEDCT is high.

Figure 3A:
FIGS. 3A-3D are graphical views, respectively, of a test image and the results of image processing using various interpolation techniques.
Figure 3B:
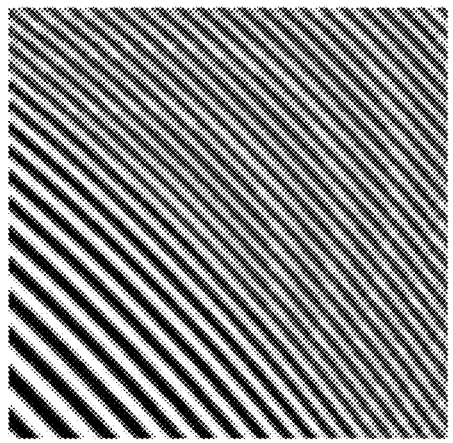
Figure 3C:
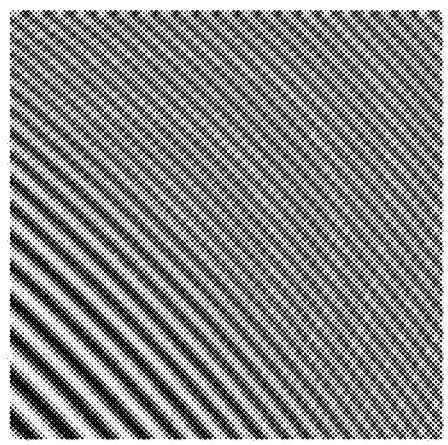
Figure 3D:
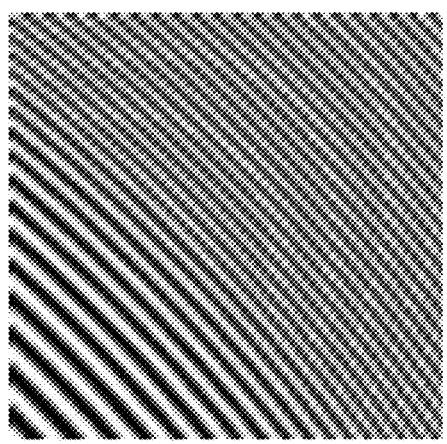

The efficiency of the CEDCT interpolator can be significantly increased for interpolation on the set of discrete points $\{x_p=p/M\}_{p=0}^M$ where M=m×N, and the zooming factor m is an integer. The CEDCT in this case is reduced to the discrete interpolator by DCT-I derived earlier using the zero-padding method (described below). An example of image interpolation by 2-dimensional DCT-I using m=4 is shown in FIGS. 3A-3D. FIG. 3A shows a test image of concentric circles, and FIG. 3B is the result of interpolation of the high frequency corner of the FIG. 3A image using two-dimensional DCT-I. As a comparison to other methods, FIG. 3C shows the result of zooming using a bilinear interpolation, while FIG. 3D shows the result of bicubic interpolation.

Fast Cosine Transform Interpolation

A new M=mN interval grid may be taken from the original N-interval grid by dividing each of the intervals onto m equal subintervals. The discrete interpolation formula at the points $\{x_p=p/M\}_{p=0}^{M}$ follows directly from equation (5) by substituting $x=x_p$. To identify m, the set $\{a_k\}$, and the transform type, the interpolated values $F_N(x_p)$ are denoted as $C_m^I(p; a_k, N)$.

$$C_m^I(p; a_k) = \sum_{k=0}^{N} a_k \cos\frac{\pi p k}{M}. \tag{6}$$

By formally adding $a_k=0$ for (k=N+1, ..., M) to the original set $\{a_k\}$, the equation (6) can be brought to the common form of M-interval inverse DCT-1 where both p and k vary in the range from 0 to M. This method of "zero padding" allows computation of the transform (6) by any FFT/FCT algorithm developed for square (M+1)×(M+1) size transform matrices $$\left(t_{pk} \equiv \cos\frac{\pi p k}{M}\right).$$

This method would additionally incorporate a "zero pruning" technique (i.e., cutting off the empty (zero) branches in the algorithmic tree). Furthermore, for high performance of this approach, the value M=Nm should be typically of radix-2 length, $M=2^k$. It then also implies a radix-2 length for m, which represents a substantial practical limitation for the zooming factor.

In this embodiment, only the length of the original data block should satisfy the radix-2 condition $N=2^r$, or more generally $N=q\times 2^r$ where q is any small integer like 2, 3, 4, while the zooming factor can be any integer m. The invention does not use the zero-padding technique and manipulates with the rectangular transform matrix $t_{pk}$ in equation (6) of size (M+1)×(N+1) with M/N=m≥1. Besides $C_{m,N}^I$, the algorithm developed here involves the following transforms defined on sets of relevant transform coefficients $\{a_k\}_{k=0}^{N}$ for p=0, 1, ..., M points of the interpolated grid.

A. The (Modified) DCT-II Interpolator:

$$C_{m,N}^{II}(p; a_k) = \sum_{k=0}^{N-1} a_k \cos\frac{\pi(2k+1)p}{2M} \tag{7}$$

Note that $C_{m,N}^{II}(M; a_k)=0$
B. The (Modified) DST-I Interpolator:

$$S_{m,N}^{I}(p; a_k) = \sum_{k=1}^{N-1} a_k \sin\frac{\pi k p}{M} \tag{8}$$

Here both $S_{m,N}^{I}(0; a_k)=0$ and $S_{m,N}^{I}(M; a_k)=0$.

C. The (Modified) DST-II Interpolator:

$$S_{m,N}^{II}(p; a_k) = \sum_{k=0}^{N-1} a_k \sin\frac{\pi(2k+1)p}{2M} \tag{9}$$

In this transform $S_{m,N}^{II}(M; a_k)=0$.

We note that in principle each of these transforms can be used for data interpolation, provided the coefficients $\{a_k\}$ are calculated from $\{f_k\}$ using the corresponding inverse transform.

The following are the symmetry properties of these transforms.

$$C_{m,N}^{I}(2M-p; a_k) = C_{m,N}^{I}(p; a_k) \tag{10}$$

$$C_{m,N}^{II}(2M-p; a_k) = -C_{m,N}^{II}(p; a_k) \tag{11}$$

$$S_{m,N}^{I}(2M-p; a_k) = -S_{m,N}^{I}(p; a_k) \tag{12}$$

$$S_{m,N}^{II}(2M-p; a_k) = -S_{m,N}^{II}(p; a_k) \tag{13}$$

Procedure for Recursive Reduction of the Transform Size.

Splitting the initial set $\{a_k\}_{k=0}^{N}$ into even and odd k-index subsets, $\{e_k \equiv a_{2k}\}_{k=0}^{N_1}$ and $\{o_k \equiv a_{2k+1}\}_{k=0}^{N_1}$ where $N_1=N/2$, the transform (6) is reduced to:

$$C_{m,N}^{I}(p; a_k) = \sum_{k=0}^{N_1} a_{2k}\cos\frac{\pi k p}{M_1} + \sum_{k=0}^{N_1-1} a_{2k+1}\cos\frac{\pi(2k+1)p}{2M_1} \tag{14}$$

$$= C_{m,N_1}^{I}(p; e_k) + C_{m,N_1}^{II}(p; o_k)$$

where $M_1=M/2$. The relation (14) is used for $0 \le p=p_1 \le M_1$. For larger values, $M_1 < p \le M$, we consider $p_1=M-p$, such that $0 \le p_1 < M_1$. Substituting $p=M-p_1$ in the equation (14) and using the properties (10) and (11) results in butterfly relation:

$$C_{m,N}^{I}(M-p_1; a_k) = C_{m,N_1}^{I}(p_1; e_k) - C_{m,N_1}^{II}(p_1; o_k) \tag{15}$$

The second recursion step deals with the DCT-II. The FCTI algorithm presented here provides a "short-cut" from DCT-II to DCT-I and DST-I of shorter radix subsequences, and avoids the computationally most costly DCT-IV type. Although in case of m=1 (i.e. "no interpolation" case) the number of flops in FCTI at the end is not much different from the record algorithms involving DCT-IV, the structure of the developed algorithmic tree for interpolation appears more simple, it only involves DCT-I, DCT-II, DST-I and DST-II interpolators.

By even-odd index splitting, the DCT-II interpolator of equation (7) can be represented as:

$$C_{m,N}^{II}(p; a_k) = \sum_{k=0}^{N_1-1} a_{2k}\cos\frac{\pi(4k+1)p}{2M} + \sum_{k=0}^{N_1-1} a_{2k+1}\cos\frac{\pi(4k+3)p}{2M} \tag{16}$$

For the even-indexed subsequence we use the expansion:

$$\cos\frac{\pi(4k+1)p}{2M} = \cos\theta_{M,p}\cos\frac{2\pi k p}{M} - \sin\theta_{M,p}\sin\frac{2\pi k p}{M}, \tag{17}$$

where $$\theta_{M,p} \equiv \frac{\pi p}{2M}.$$

For the odd-indexed subsequence first a shift from the index $k \leq (N-1)$ to $k+1 \leq N$ is suggested, followed by expansion $$\cos\frac{\pi(4k+3)p}{2M} = \cos\theta_{M,p}\cos\frac{\pi 2(k+1)p}{M} + \sin\theta_{M,p}\sin\frac{\pi 2(k+1)p}{M}, \quad (18)$$

This results in a short-cut in the recursion loops from $C_{m,N}^{II}$ back to type-I transforms, $$C_{m,N}^{II}(p; a_k) = \cos\theta_{M,p} C_{m,N_1}^{I}(p; s_k) - \sin\theta_{M,p} S_{m,N_1}^{I}(p; d_k) \quad (19)$$

where $N_1 = N/2$, and the sets $\{s_k\}_{k=0}^{N_1}$ and $\{d_k\}_{k=0}^{N_1}$ are $$s_k = \begin{cases} a_0 & \text{for } k=0 \\ a_{2k-1} + a_{2k} & \text{for } k=1,\ldots,N_1-1 \\ a_{N-1} & \text{for } k=N_1 \end{cases} \quad (20)$$

$$d_k = \begin{cases} a_0 & \text{for } k=0 \\ a_{2k} + a_{2k-1} & \text{for } k=1,\ldots,N_1-1 \\ -a_{N-1} & \text{for } k=N_1 \end{cases} \quad (21)$$

As for equation (14), the recursion (19) is used for the first half of p values, i.e. for $0 \leq p = p_1 \leq M_1 = M/2$. For the second half, i.e., for $M_1 + 1 \leq p \leq M$, a typical butterfly with rotation by the angle $$\theta_{M,p_1} = \frac{\pi p_1}{2M}$$

is produced by substituting $p = M - p_1$ in relation (19) using the symmetry properties (10) and (12):

$$C_{m,N}^{II}(M-p_1; a_k) = \sin\theta_{M,p_1} C_{m,N_1}^{I}(p_1; s_k) - \cos\theta_{M,p_1} S_{m,N_1}^{I}(p_1; d_k) \quad (22)$$

Similar "split and shift" steps applied to DST interpolators result in the following recursions for $0 \leq p = p_1 \leq M_1 = mN_1$ and $M_1 < p = M - p_1 < 2M_1 = M$.

$$S_{m,N}^{I}(p_1; a_k) = S_{m,N_1}^{I}(p_1; e_k) + S_{m,N_1}^{II}(p_1; o_k) \quad (23)$$

$$S_{m,N}^{I}(M-p_1; a_k) = -S_{m,N_1}^{I}(p_1; e_k) + S_{m,N_1}^{II}(p_1; o_k) \quad (24)$$

$$S_{m,N}^{II}(p_1; a_k) = \sin\theta_{M,p_1} C_{m,N_1}^{I}(p_1; d_k) + \cos\theta_{M,p_1} S_{m,N_1}^{I}(p_1; s_k) \quad (25)$$

$$S_{m,N}^{II}(M-p_1; a_k) = \cos\theta_{M,p_1} C_{m,N_1}^{I}(p_1; d_k) - \sin\theta_{M,p_1} S_{m,N_1}^{I}(p_1; s_k) \quad (26)$$

where $$\theta_{M,p_1} = \frac{\pi p_1}{2M},$$

the sets $\{e_k \equiv a_{2k}\}$, $\{o_k \equiv a_{2k+1}\}$, and $\{s_k\}$, $\{d_k\}$ are defined by equations (20) and (21).

Figure 4:
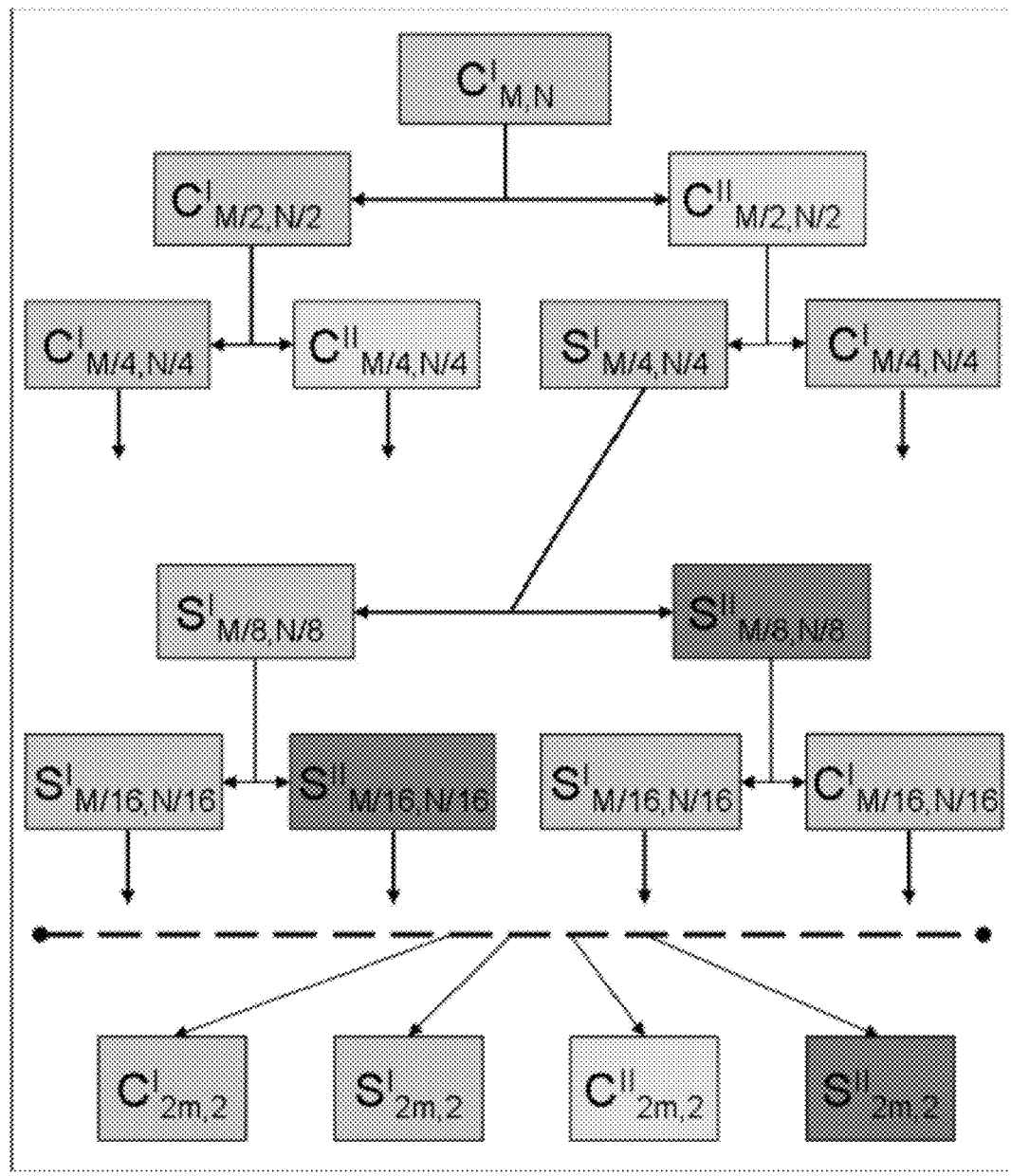
FIG. 4 is a diagrammatic view of recursion loops that may be used with the present invention.

The recursion loops that may be used with the present invention are shown diagrammatically in FIG. 4. As shown, the DCT-I interpolator $C_{M,N}^{I}$ can be subdivided into a DCT-I transform $C_{M/2,N/2}^{I}$ and a DCT-II transform $C_{M/2,N/2}^{II}$ by splitting the initial set into even and odd k-index subsets. The shortcut in the recursion loops proceeds from $C_{M/2,N/2}^{II}$ to type I transforms $S_{M/4,N/4}^{I}$ and $C_{M/4,N/4}^{I}$. The $S_{M/4,N/4}^{I}$ transform may then be divided in a "split and shift" step to transforms $S_{M/8,N/8}^{I}$ and $S_{M/8,N/8}^{II}$. From this point, $S_{M/8,N/8}^{I}$ may divide to $S_{M/16,N/16}^{I}$ and $S_{M/16,N/16}^{II}$, while $S_{M/8,N/8}^{II}$ may be further broken down to $S_{M/16,N/16}^{I}$ and $C_{M/16,N/16}^{I}$. Further recursion may be done as necessary to arrive at the final reduced-size transforms, such as those shown in the figure (for q=2 in this example, assuming a radix-2 based initial transform size $N = q \times 2^r$).

Calculations of the Small-Size Transforms, N=q (A) Algorithms and Flop Numbers in Case of q=2

Recursive radix reduction of the transform size stops when $N_1 = N/2 = q$ and $M_1 = mN_1 = mq$. The case of q=2 appears to provide the most convenient implementation of the technology. Then non-rectangular FCTI matrices of size either $(2m+1) \times 3$ or $(2m+1) \times 2$, depending on DST-I/II or DCT-I/II, should be computed. For simplicity of notations, in this section we omit the subscripts (m,2) and the identification of $a_k$ coefficients in the list of arguments of the transforms, i.e. $C_{m2}^{X}(p; a_k) = C^X(p)$ and $S_{m2}^{X}(p; a_k) = S^X(p)$.

The DCT-I interpolator for $0 \leq p \leq 2m$ is $$C^I(p) = a_0 + a_1 \cos\frac{\pi p}{2m} + a_2 \cos\frac{\pi p}{m}. \quad (27)$$

The following terms should be calculated in case of any $m \geq 1$, including the case of m=1 (i.e. 'no interpolation'):

$$C^I(0) = a_0 + a_1 + a_2$$

$$C^I(m) = a_0 - a_2$$

$$C^I(2m) = a_0 - a_1 + a_2 \quad (28)$$

It requires 4 flops (only additions in this case). In general case of m>1 we assume $p = 1, \ldots, m-1$ and calculate (27) together with:

$$C^I(2m-p) = a_0 - a_1 \cos\frac{\pi p}{2m} + a_2 \cos\frac{\pi p}{m}. \quad (29)$$

This requires 5 flops (2 multiplications and 3 additions) for each p. The total number of flops is $K_{CI}(m, 2) = 5(m-1) + 4 = 5m-1$.

The DCT-II interpolator in case of N=2 can be represented as:

$$C^{II}(p) = a_0 \cos\frac{\pi p}{4m} + a_1 \cos\frac{3\pi p}{4m} \quad (30)$$

$$= \left(a_0 - a_1 + 2a_1 \cos\frac{\pi p}{2m}\right) \cos\frac{\pi p}{4m}.$$

First the following terms are computed:

$$C^{II}(0) = a_0 + a_1 \quad (31)$$

$$C^{II}(m) = a_0 \cos\frac{\pi}{4} + a_1 \cos\frac{3\pi}{4} = (a_0 - a_1)/\sqrt{2}$$

$$C^{II}(2m) = 0.$$

Three flops are needed here. Then for $1 \leq p \leq m-1$, we simultaneously compute $C^{II}(p)$ and:

$$C^{II}(2m-p) = \left(a_0 - a_1 - 2a_1 \cos\frac{3\pi p}{2m}\right) \sin\frac{\pi p}{4m}. \quad (32)$$

As $d_{01} = a_2 - a_1$ is already calculated in equation (31), the flop number for each p in equation (32) is 5. Thus, the total number of flops for calculation of $\{C^{II}(p)\}_{p=0}^{2m}$ is is $K_{C2}(m, 2) = 5(m-1) + 3 = 5m-2$.

For the DST-I interpolator we have $S^I(0) = S^I(2m) = 0$, and $S^I(m) = a_1$. For the rest we consider $p = 1, \ldots, m-1$ to calculate:

$$S^I(p) = a_1 \sin\frac{\pi p}{2m} + a_2 \sin\frac{\pi p}{m} \tag{33}$$

$$S^I(2m-p) = a_1 \sin\frac{\pi p}{2m} - a_2 \sin\frac{\pi p}{m}.$$

Note that in case of m=1 the last term with $a_2$ vanishes, as it does for standard DST-I without interpolation. The number of flops needed for calculation of equation (33) is $K_{S1}(m, 2)=4(m-1)$.

The DST-II interpolator is given by:

$$S^{II}(0)=0$$

$$S^{II}(m)=(a_0+a_1)/\sqrt{2},$$

$$S^{II}(2m)=a_0-a_1 \tag{34}$$

and for the rest, assuming (p=1, ..., m−1), we have:

$$S^{II}(p) = \left(a_0 + a_1 + 2a_1\cos\frac{\pi p}{2m}\right)\sin\frac{\pi p}{4m} \tag{35}$$

$$S^{II}(2m-p) = \left(a_0 + a_1 - 2a_1\cos\frac{\pi p}{2m}\right)\cos\frac{\pi p}{4m}.$$

The number of flops needed here is $K_{S2}(m, 2)=5m-2$, the same as for $K_{C2}(m, 2)$.

The total number of flops $K(m,N)$ for larger radix-2 size transforms, $N=2^r>2$, can be computed using the derived boundary values at N=q=2 and the recursion formulae:

$$K_{C1}(m,N)=K_{C1}(m,N_1)+K_{C2}(m,N_1)+M \tag{36}$$

$$K_{S1}(m,N)=K_{S1}(m,N_1)+K_{S2}(m,N_1)+K_{S2}(m,N_1)+M-2 \tag{37}$$

$$K_{C2}(m,N)=K_{C1}(m,N_1)+K_{S1}(m,N_1)+3M+N-7 \tag{38}$$

$$K_{S2}(m,N)=K_{C2}(m,N) \tag{39}$$

where $N_1 \equiv N/2$. These recursions follow directly from the recursion steps described above. In Table I, the results of calculations for several values of N and arbitrary m are shown.

TABLE I

| N | $K_{C1}$ | $K_{S1}$ | $K_{C2} = K_{S2}$ |
|---|---|---|---|
| 4 | 14m − 3 | 13m − 8 | 21m − 8 |
| 8 | 43m − 11 | 42m − 18 | 51m − 10 |
| 16 | 110m − 21 | 109m − 30 | 133m − 20 |
| 32 | 275m − 41 | 274m − 52 | 315m − 26 |
| 64 | 654m − 67 | 653m − 80 | 741m − 36 |
| 128 | 1523m − 103 | 1522m − 118 | 1691m − 26 |

The Flop Numbers K(m,N) for DCT/DST-Based Interpolators in 1D Case

Flop numbers per interpolation point given by $I^{1D}(m,N)$ K(m,N)/M can be used to estimate the computational cost of the algorithm.

Using the values in Table I, for m≥2, it can be approximated as:

$$I^{1D}(m,N)=\alpha \log_2 N \tag{40}$$

where the parameter $\alpha$ only weakly depends on N. For DCT and DST of type-I it is in a narrow range $\alpha=1.75\pm0.04$. For DCT/DST of type II it is a bit larger, $\alpha\approx2\pm0.1$, except for the case of N=4 when $\alpha\approx21/8=2.625$. Note that the cost is basically independent on zooming factor m≥2. In particular cases of m, such as m=2 or 3, the computational cost can be slightly reduced further by taking into account in $C_{m2}$ and $S_{m2}$ that $\sin(\pi/4)=\cos(\pi/4)$, or that $\cos(\pi/3)$ and $\sin(\pi/6)$ are equal to ½. However, this is done on the expense of additional complication of the algorithmic tree.

(B) Algorithms in Case of q>2.

Besides q=2, the other values of interest for practical applications of FCTI of length $N=q\times2^r$ are q=3 and q=4. These numbers are reasonably small to make worth the direct calculation of the FCTI matrices of size (qm×q) in the final stage after k recursive reduction steps of the radix-2 type are performed.

Although the case of q=4 also is formally of pure radix-2 type, direct calculations of the interpolator matrices of size (4m×4) could lead to additional reduction of computational cost by (10-20) %. For example, using the known trigonometric function expansion formulae.

$$\cos 3\alpha = \cos\alpha(2\cos 2\alpha - 1)$$

$$\cos 5\alpha = \cos\alpha(2\cos 4\alpha - 2\cos 2\alpha - 1)$$

$$\cos 7\alpha = \cos\alpha(4\cos 4\alpha \cos 2\alpha - 2\cos 4\alpha - 1)$$

the DCT-II interpolator (7)

$$C_{m,4}^{II}(p) = \sum_{k=0}^{3} a_k \cos\frac{\pi(2k+1)p}{8m}$$

for $0 \leq p \leq 4m$ is represented as $$C_{m,4}^{II}(p) =$$
$$\cos\frac{\pi p}{8m}\left[(a_0 - a_1 + a_2 - a_3) + 2(a_2 - a_3)\cos\frac{\pi p}{2m} + 2(a_1 - a_2)\cos\frac{\pi p}{4m} + 4a_3\cos\frac{\pi p}{2m}\cos\frac{\pi p}{4m}\right]$$

with the symmetry property $$C_{m,4}^{II}(4m-p) =$$
$$\sin\frac{\pi p}{8m}\left[(a_0 - a_1 + a_2 - a_3) + 2(a_2 - a_3)\cos\frac{\pi p}{2m} - 2(a_1 - a_2)\cos\frac{\pi p}{4m} - 4a_3\cos\frac{\pi p}{2m}\cos\frac{\pi p}{4m}\right]$$

Calculations of this transform can be completed with $K_{C2}(4m)=(16m-4)$ flops as compared with $K_{C2}(4m)=(21m-8)$ flops if reduction to (2m×2) size matrices is done.

The case of q=3 is another one where the method can be applied effectively. The symmetry properties similar to (14), (15), (22)-(26) acquire the following explicit form:
For Type-I Interpolators:

$$C^I_{m,4}(p) = a_0 + a_1\cos\frac{\pi p}{3m} + a_2\cos\frac{2\pi p}{3m} + a_3\cos\frac{\pi p}{m}$$

$$C^I_{m,4}(3m-p) = a_0 - a_1\cos\frac{\pi p}{3m} + a_2\cos\frac{2\pi p}{3m} - a_3\cos\frac{\pi p}{m}$$

$$S^I_{m,4}(p) = a_1\sin\frac{\pi p}{3m} + a_2\sin\frac{2\pi p}{3m} + a_3\sin\frac{\pi p}{m}$$

$$S^I_{m,4}(3m-p) = a_1\sin\frac{\pi p}{3m} - a_2\sin\frac{2\pi p}{3m} + a_3\sin\frac{\pi p}{m}$$

For Type-II Interpolators $$C^{II}_{m,4}(p) = \cos\frac{\pi p}{6m}\left[(a_0-a_1+a_2)+2(a_1-a_2)\cos\frac{\pi p}{3m}+2a_2\cos\frac{2\pi p}{3m}\right]$$

$$C^{II}_{m,4}(3m-p) = \sin\frac{\pi p}{6m}\left[(a_0-a_1+a_2)-2(a_1-a_2)\cos\frac{\pi p}{3m}+2a_2\cos\frac{2\pi p}{3m}\right]$$

$$S^{II}_{m,4}(p) = \sin\frac{\pi p}{6m}\left[(a_0+a_1+a_2)+2(a_1+a_2)\cos\frac{\pi p}{3m}+2a_2\cos\frac{2\pi p}{3m}\right]$$

$$S^{II}_{m,4}(3m-p) = \cos\frac{\pi p}{6m}\left[(a_0+a_1+a_2)-2(a_1+a_2)\cos\frac{\pi p}{3m}+2a_2\cos\frac{2\pi p}{3m}\right]$$

Also in this case the computational cost per interpolation point is very low, being quite comparable with or even less than the cost of similar interpolators based on pure radix-2 size blocks, i.e. q=2 and q=4. For example, the number of flops for type-II interpolators with q=3 is $K_{C2}(3m)=(21m-1)/2$ (for odd m), whereas $K_{C2}(4m)=(21m-8)$ in case of q=2.

Multidimensional Interpolation

DCT/DST interpolation for multidimensional data is straightforward [8]. For 2-dimensional (2D) data $\{f_{nl}\}$ defined on $N_x \times N_y$-interval grid the DCT-I interpolation onto a grid with $m_x \times m_y$ times higher density of points is given by:

$$C^I_{m_xN_x,m_yN_y}(p,k) = \sum_{j=0}^{N_y}\cos\frac{\pi pj}{M_y}\sum_{i=1}^{N_x}A_{ij}\cos\frac{\pi ki}{M_x} \quad (41)$$

where $M_x=m_xN_x$, $M_y=m_yN_y$, p=0, 1 ..., $M_x$, and k=0, 1 ..., $M_y$, and the coefficients $A_{ij}$ are given by the product of the direct DCT-I in x and y directions, $$A_{ij} = \sum_{l=0}^{N_y}\sum_{n=0}^{N_x}\frac{4c_{N_x,i}c_{N_x,n}c_{N_y,j}c_{N_y,l}}{N_xN_y}f_{nl}\cos\frac{\pi ni}{N_x}\cos\frac{\pi lj}{N_y}, \quad (42)$$

Thus, since the transform is separable, interpolation of 2D data can be done first along x-axis for each of the $(N_y+1)$ values of j. This step requires $K_{C1}(m_x,N_x)\times(N_y+1)$ flops. Then calculations are done along y-axis for each of $(M_x+1)$ values of k. The total number of flops in this scheme is:

$$K_{2D}(m_x,N_x;m_y,N_y)=K_{C1}(m_x,N_x)(N_y+1)+K_{C1}(m_y,N_y)(m_xN_x+1) \quad (44)$$

Those skilled in the art will note the asymmetry of equation (44) with respect to x and y. Therefore, the number of flops will depend on the direction chosen for the first transformation. For example, $K_{2D}(3, 8; 3, 32)=23494$ whereas $K_{2D}(3, 32; 3, 8)=18502$. In general, in case of non-square blocks, $N_x*N_y$, the first transformation should be done in the direction of the larger side, i.e., choosing $N_y \leq N_x$. This is because in 1D case $K_{C1}(m,N) \approx mN(\alpha \log_2 N)$, where $\alpha \geq 2$, as shown above.

As an example, one may assume for simplicity that $N_x=N_y=N$, $m_x=m_y=m$, and consider the number of flops per interpolated pixel, $I^{2D}(m,N)$ in 2D case. Since the number of pixels in the new grid is $(M+1)^2 \approx M^2$, equation (44) gives $I(m,N)=K_{C1}(m,N)(M+N+2)/(M+1)^2 \approx K_{C1}(m,N)/(mN) \approx \alpha \log_2 N$. Thus, for the proposed technology, with increasing zooming factor m the computational cost per interpolated pixel defined by I(m,N) becomes practically independent of the number m. The can be approximated as $I(m,N) \simeq 2 \log_2 N$, which is an almost exact formula in case of m=5.

TABLE II

The flop numbers I(m, N) per interpolation point in 2D case for square blocks, $N_x = N_y = $ N, with equal zooming factors m along x- and y-axes.

| N | m = 2 | m = 3 | m = 5 | m = 10 |
|---|---|---|---|---|
| 4 | 4.32 | 4.15 | 3.95 | 3.75 |
| 8 | 6.75 | 6.42 | 6.07 | 5.75 |
| 16 | 9.14 | 8.49 | 7.90 | 7.41 |
| 32 | 11.81 | 10.83 | 9.98 | 9.31 |
| 64 | 14.47 | 13.13 | 12.00 | 11.12 |

The numbers in Table II are favorably comparable with the ones by the other popular interpolation algorithms. Even the bilinear algorithm, the fastest of the known algorithms that provide an acceptable quality for the interpolated image needs normally 12-16 flops per interpolation point (depending on the implementation).

Table III compares the computational cost of the proposed FCTI technology with the previous DCT interpolation technologies that have used the methods of zero-padding possibly complemented with the zero-pruning method. Comparison is done in terms of CPU times needed for interpolation of 256×256 size random image (using Intel Core2 Duo E6850 processor) and in terms of relative costs defined as the ratio of the processing times. The table shows that even for the low zooming factor, m=2, FCTI is by (25-30) % more cost-efficient than the previous technology. For larger zooming factors the relative efficiency of FCTI becomes significantly larger, up to a factor RC~2 and more.

TABLE III

Computational cost, in terms of CPU times and relative cost, of the FCTI method compared with the zero—padding and zero—pruning methods.

| Interpolator | Block length N | Zooming factor m | Interpolation time t (in sec) | Relative cost RC |
|---|---|---|---|---|
| 0—padding | 4 | 4 | 0.0254 | 1.40 |
| 0—prunning | | | 0.0269 | 1.49 |
| FCTI | | | 0.0181 | 1 |
| 0—padding | 4 | 8 | 0.131 | 2.30 |
| 0—prunning | | | 0.094 | 1.64 |
| FCTI | | | 0.057 | 1 |
| 0—padding | 4 | 16 | 0.622 | 3.08 |
| 0—prunning | | | 0.336 | 1.66 |

TABLE III-continued

Computational cost, in terms of CPU times and relative cost, of the FCTI method compared with the zero—padding and zero—pruning methods.

| Interpolator | Block length N | Zooming factor m | Interpolation time t (in sec) | Relative cost RC |
|---|---|---|---|---|
| FCTI | | | 0.202 | 1 |
| 0—padding | 8 | 2 | 0.0092 | 1.23 |
| 0—prunning | | | 0.0095 | 1.27 |
| FCTI | | | 0.0075 | 1 |
| 0—padding | 8 | 4 | 0.0387 | 1.99 |
| 0—prunning | | | 0.0392 | 2.02 |
| FCTI | | | 0.0194 | 1 |
| 0—padding | 8 | 8 | 0.167 | 2.68 |
| 0—prunning | | | 0.145 | 2.32 |
| FCTI | | | 0.062 | 1 |
| 0—padding | 8 | 16 | 0.765 | 3.49 |
| 0—prunning | | | 0.474 | 2.16 |
| FCTI | | | 0.219 | 1 |
| 0—padding | 16 | 2 | 0.0137 | 1.32 |
| 0—prunning | | | 0.0141 | 1.35 |
| FCTI | | | 0.0104 | 1 |
| 0—padding | 16 | 4 | 0.0497 | 1.90 |
| 0—prunning | | | 0.0509 | 1.94 |
| FCTI | | | 0.0262 | 1 |
| 0—padding | 16 | 8 | 0.205 | 2.51 |
| 0—prunning | | | 0.177 | 2.17 |
| FCTI | | | 0.082 | 1 |
| 0—padding | 16 | 16 | 0.885 | 3.04 |
| 0—prunning | | | 0.613 | 2.11 |
| FCTI | | | 0.291 | 1 |
| 0—padding | 32 | 4 | 0.0606 | 1.75 |
| 0—prunning | | | 0.0613 | 1.77 |
| FCTI | | | 0.0347 | 1 |
| 0—padding | 32 | 8 | 0.238 | 2.25 |
| 0—prunning | | | 0.218 | 2.04 |
| FCTI | | | 0.107 | 1 |
| 0—padding | 32 | 16 | 1.05 | 2.82 |
| 0—prunning | | | 0.755 | 2.03 |
| FCTI | | | 0.372 | 1 |

In Table IV the times, in milliseconds, for zooming of the same monochrome 512×512-pixel size test image by a bilinear interpolation algorithm, implemented in a twelve flops per pixel scheme, the bicubic interpolation (~60 flops/pix) and by the FCTI are compared. The computation was done using Intel Core2 Duo E6850 processor, a scalar code (without exploiting parallel processing capabilities).

It should be noted that for all block sizes N and zoom factors m the pure interpolation times by FCTI are only by factors ~(3-5) larger than the blocking (decomposition-and-assembly) times. Therefore in case of implementation parallel computing scheme, the overall time will be mostly defined by the image block decomposition & assembly time.

The FCTI algorithm gains further, compared with the computational cost of common linear and cubic interpolation algorithms, in case of larger dimensionality of the data. In case of 3D data, such as video or MRI images, the FCTI algorithm is implemented by successive application of 1D FCTI along x, y and z directions. For an original block of radix-2 lengths $(N_x, N_y, N_z)$ along each axis, the total number of flops is given by the formula:

$$K_{3D}(m_x,N_x;m_y,N_y;m_z,N_z) = K_{C1}(m_x,N_x)(N_y+1)(N_z+1) + K_{C1}(m_y,N_y)(m_xN_x+1)(N_z+1) + K_{C1}(m_z,N_z)(m_xN_x+1)(m_yN_y+1) \quad (45)$$

In case of zoom factors $m_z \geq 3$ this number is mostly contributed by the last term in equation (45). The implication is that the number of flops per interpolated pixel is determined first of all by $N_z$ (provided $N_x$ and $N_y$ are not much larger than $N_z$).

Then the number of flops per pixel would be of order $2 \log_2 N_z$. For example, taking $m_x=m_y=m_z=5$ and $N_x=N_y=16$, the number of flops per pixel is ≈6.71, 8.19, 9.91 for $N_z=8$, 16 and 32, respectively. Meanwhile, for a trilinear interpolation the computational cost per pixel would increase by a factor of ~2 because bilinear interpolation in two parallel planes perpendicular to z-axis must be done.

The FCTI algorithm is based on the idea that, instead of inflating the transform size by padding zeros to the set of DCT coefficients in order to compute FCT for a square matrix of size ~(M×M), radix-2 FFT steps are performed on non-square matrices of size (M×N) until the matrix size is reduced to qm×q. It is important that the zooming factor m can be chosen as any integer number without creating any complications in the method, and only the length of the data set is to be of radix-2 based length, $N=q \times 2^r$.

Those skilled in the art will also realize that a related feature important for practical use of this invention is that FCTI implementation requires dynamical memory allocation matrices and pre-calculated lookup tables of significantly (by the zooming factor m) smaller size than the methods of zero-padding and zero-pruning. Meanwhile, the memory requirements become critical particularly for implementations of technologies in hardware chips having limited operational memory space.

In principle, any FFT/FCT approach can be used at the step of radix reduction down to N=2. The least expensive computationally have in the past been the algorithms exploiting the "split-radix" approach. In case of m=1 the interpolation method proposed can be compared with the best current FCT algorithms. For example, the flop numbers for DCT-I by a split-radix matrix factorization algorithm may be equal to $K_{C1}(N)=42$, 113, 292, 723 and 1734 for N=8, 16, 32, 64 and 128, respectively. As follows from Table I, in case of m=1 the split-shift algorithm needs $K_{C1}=32$, 89, 234, 587, 1420 flops for the same respective values of N. The proposed FCTI algorithm with m=1 can also be used for computation of the DCT-I set $\{a_k\}$. Indeed, equation (1) is brought to the form of equation (3) by rescaling $2c_{N,n}f_n/N=\bar{f}_n$ and $2a_0=\bar{a}_0$, $2a_N=\bar{a}_N$. Because $N=2^r$, this rescaling does not change the total flop numbers of the algorithm.

Note that not only the DCT-I interpolator (6), but also any of the transforms given by (7), (8), (9) can be used for data interpolation, provided that the set of coefficients $\{a_i\}$ is computed using the appropriate inverse. In order to interpolate with $C^{II}$, i.e., on the basis of DCT-II, the set $\{a_i\}_{i=0}^{N-1}$ is to be computed from $\{f_i\}_{i=0}^{N-1}$ using DCT-III.

A significant feature of the present invention is that the computational cost per interpolated image pixel remains almost the same with the increase of the dimensionality of the data. For 2D data/image interpolation one needs only $I(m,N) \simeq 2 \times r$ flops per point with square blocks $N_x=N_y=N$. Similarly, for 3D data the computational cost depends first of all on the value of $N_z$, and again it is about $2 \log_2 N_z$ for $m_z \geq 3$.

The standard bilinear algorithm requires ≥12 flops per interpolation point. As a result, the computation time by FCTI may be even smaller than by the bilinear algorithm, as shown in Table II. It is noteworthy that all the known algorithms that provide interpolation quality superior to bilinear, such as bicubic or spline, need computation times by factors ~(3-10) times larger than the bilinear. At the same time,

TABLE IV

| Method | Block size $N_x \times N_y$ | Zoom factors $m_x \times m_y$ | Interpolation Times (CPU, in ms) | |
|---|---|---|---|---|
| | | | total | per $10^6$ pix |
| FCTI | 9 × 9 | 2 × 2 | 33.0 | 31.5 |
| Bilinear | | | 45.0 | 43.0 |
| Bicubic | | | 148 | 141 |
| FCTI | 9 × 9 | 3 × 3 | 54.0 | 22.9 |
| Bilinear | | | 99.0 | 42.1 |
| Bicubic | | | 268 | 114 |
| FCTI | 9 × 9 | 5 × 5 | 118 | 18.1 |
| Bilinear | | | 266 | 40.7 |
| Bicubic | | | 657 | 101 |
| FCTI | 17 × 17 | 2 × 2 | 45.0 | 43.0 |
| Bilinear | | | 43.0 | 41.1 |
| Bicubic | | | 132 | 126 |
| FCTI | 17 × 17 | 3 × 3 | 77.0 | 32.7 |
| Bilinear | | | 94.0 | 39.9 |
| Bicubic | | | 252 | 107 |
| FCTI | 17 × 17 | 5 × 5 | 157 | 24.0 |
| Bilinear | | | 258 | 39.5 |
| Bicubic | | | 620 | 95.9 |
| FCTI | 33 × 33 | 2 × 2 | 65.0 | 62.1 |
| Bilinear | | | 41.0 | 39.2 |
| Bicubic | | | 132 | 126 |
| FCTI | 33 × 33 | 3 × 3 | 98.0 | 41.6 |
| Bilinear | | | 92.0 | 39.1 |
| Bicubic | | | 242 | 103 |
| FCTI | 33 × 33 | 5 × 5 | 204 | 31.2 |
| Bilinear | | | 255 | 39.0 |
| Bicubic | | | 610 | 93.4 |
| FCTI | 65 × 65 | 4 × 4 | 177 | 42.3 |
| Bilinear | | | 162 | 38.7 |
| Bicubic | | | 401 | 95.8 |

TABLE V

| Method | Block size $N_x \times N_y \times N_z$ | Zoom factors $m_x \times m_y \times m_z$ | Interpolation Times (CPU) | |
|---|---|---|---|---|
| | | | total (in s) | per $10^6$ pix (in ms) |
| Trilinear | 5 × 5 × 5 | 2 × 2 × 2 | 0.56 | 65.5 |
| FCTI | | | 0.29 | 34.3 |
| Trilinear | 5 × 5 × 5 | 4 × 4 × 4 | 3.80 | 56.2 |
| FCTI | | | 1.13 | 16.8 |
| Trilinear | 5 × 5 × 5 | 5 × 5 × 5 | 7.17 | 54.3 |
| FCTI | | | 1.92 | 14.5 |
| Trilinear | 9 × 9 × 9 | 2 × 2 × 2 | 0.47 | 55.2 |
| FCTI | | | 0.34 | 39.4 |
| Trilinear | 9 × 9 × 9 | 3 × 3 × 3 | 1.50 | 52.3 |
| FCTI | | | 0.81 | 28.2 |
| Trilinear | 9 × 9 × 9 | 3 × 3 × 4 | 1.98 | 51.9 |
| FCTI | | | 0.86 | 22.6 |
| Trilinear | 9 × 9 × 9 | 4 × 4 × 3 | 2.59 | 50.9 |
| FCTI | | | 1.43 | 28.1 |
| Trilinear | 17 × 17 × 9 | 3 × 3 × 3 | 1.41 | 49.6 |
| FCTI | | | 0.88 | 30.8 |
| Trilinear | 17 × 17 × 17 | 2 × 2 × 2 | 0.43 | 50.3 |
| FCTI | | | 0.44 | 51.8 |
| Trilinear | 17 × 17 × 17 | 3 × 3 × 3 | 1.39 | 48.9 |
| FCTI | | | 1.03 | 35.9 |
| Trilinear | 17 × 17 × 17 | 4 × 4 × 4 | 3.23 | 47.8 |
| FCTI | | | 1.96 | 29.4 |
| Trilinear | 33 × 33 × 17 | 3 × 3 × 3 | 1.35 | 47.3 |
| FCTI | | | 1.16 | 40.6 |
| Trilinear | 33 × 33 × 33 | 2 × 2 × 3 | 0.60 | 47.3 |
| FCTI | | | 0.58 | 45.8 |
| Trilinear | 33 × 33 × 33 | 3 × 3 × 3 | 1.34 | 46.8 |
| FCTI | | | 1.30 | 45.4 |
| Trilinear | 33 × 33 × 33 | 4 × 4 × 4 | 3.14 | 46.4 |
| FCTI | | | 2.54 | 37.6 | the quality of interpolation by FCTI is at least not worse than the one by bicubic algorithm, as shown in FIG. 1.

At last, it is also worth mentioning that for multi-dimensional cases, n≥2, it is possible to develop methods that would be based on direct computation of higher-dimensional rectangular matrices and corresponding n-dimensional twiddle factors. Although it could be probably possible to reduce the interpolation cost further by this approach, reduction of n-dimensional interpolation to one-dimensional FCTI base would have an important advantage. Namely, the algorithm is simple, and does not require large memory for precomputed factors. For n-dimensional block of size N× . . . ×N, it needs precomputation of only a limited number of one-dimensional factors $$\left\{t_m(k) = \cos\left(\frac{\pi k}{M}\right)\right\}_{k=1}^{M-1},$$

where M=Nm.

The advantages of the FCTI method for 3-dimensional data become very substantial. Table V compares interpolation times (total and per megapixel) for the FCTI and trilinear methods for different block sizes and zoom factors. As shown, the FCTI method provides significant advantages in computational efficiency even compared with the fastest of the interpolation techniques, i.e. the trilinear, used for various 3D data processing applications.

While the invention has been shown and described with reference to a preferred embodiment thereof, those skilled in the art will recognize that various changes in form and detail may be made herein without departing from the spirit and scope of the invention as defined by the appended claims.

What is claimed is:

1. A method of processing in a data processor an input multidimensional dataset represented by one dimensional subsets each comprising a block of data of size N stored in a digital memory so as to provide an interpolation of the data stored therein to produce a dataset of size M, the method comprising:
    providing a data processor;
    transforming in the data processor, for each of said subsets, the block of data into the frequency domain to obtain a set of direct transform coefficients $C=\{a_k\}_{k=0}^N$ for a desired interpolator type;
    determining in the data processor an appropriate inverse discrete trigonometric transform for using said set of coefficients to calculate an interpolated dataset $$F_n = \sum_{k=0}^{N} A(n,k)\alpha_k,$$

where n=0, 1, M, and A(n,k) is a non-square matrix of size ~M×N, said determining including:
    reducing recursively the calculation of the transform to a chain of smaller transforms of size (M/2)×(N/2) until a size (qm×q) is reached, where m=M/N and q is one of the integers 2, 3 and 4; and
    calculating each of the smaller transforms directly using a family of interpolators corresponding to the symmetry properties of smaller, non-square transform matrices that result from the recursive reduction process; and computing and assembling in the data processor an output dataset of size M from the results of the calculated smaller transforms to store in a digital memory the interpolated output dataset.

2. A method according to claim 1 wherein the step of reducing recursively the calculation of the transform comprises radix-2 splitting of the initial set $\{a_k\}_{k=0}^{N}$ into even and odd k-index subsets, and $\{e_k \equiv a_{2k}\}_{k=0}^{N_1}$ and $\{o_k \equiv a_{2k+1}\}_{k=0}^{N_1}$ where $N_1=N/2$.

3. A method according to claim 2 further comprising combining the index-shifted subsets to provide short-cuts in the recursion loops from type-II transforms directly back to type-I transforms.

4. A method according to claim 1 wherein the step of calculating each of the smaller transforms comprises applying a chain of at least one of the interpolators:

$$C_m^I(p; a_k) = \sum_{k=0}^{N} a_k \cos\frac{\pi pk}{M}$$

$$C_m^{II}(p; a_k) = \sum_{k=0}^{N-1} a_k \cos\frac{\pi(2k+1)p}{2M}$$

$$S_{m,N}^I(p; a_k) = \sum_{k=1}^{N-1} a_k \sin\frac{\pi kp}{M} \text{ and}$$

$$S_{m,N}^{II}(p; a_k) = \sum_{k=0}^{N-1} a_k \sin\frac{\pi(2k+1)p}{2M}$$

where p=0, 1, ... M.

5. A method according to claim 1 wherein the step of calculating each of the non-square transforms of the final size (qm×m) comprises applying at least one of the flipping symmetry properties between the transform pairs $C_{m,q}^I(qm-p;a_k) \leftrightarrow C_{m,q}^I(p;a_k)$ $C_{m,q}^{II}(qm-p;a_k) \leftrightarrow C_{m,q}^{II}(p;a_k)$ $S_{m,q}^I(qm-p;a_k) \leftrightarrow S_{m,q}^I(p;a_k)$, and $S_{m,q}^{II}(qm-p;a_k) \leftrightarrow S_{m,q}^{II}(p;a_k)$ to reduce the number of necessary processing steps.

6. A method according to claim 1, wherein the input dataset is fast filtered by modifying the transform coefficients in the frequency domain before applying the inverse transform performing the interpolation.

7. A method according to claim 1 wherein the interpolation of a dataset of dimension larger than one is done by applying the interpolators of a one-dimensional case successively for each of the dimensions of the multidimensional dataset.

8. An image interpolator comprising a computer configured to process an input multidimensional dataset comprising a block of data of size N stored in a digital memory of the computer so as to provide an interpolation of the data stored therein to produce and store in said digital memory of the computer a dataset of M points, where M=m·N or m·(N−1)+1, in accordance with the method defined in claim 1.

9. An image interpolator comprising a computer configured to process an input multidimensional dataset comprising a block of data of size N stored in a digital memory of the computer so as to provide an interpolation of the data stored therein to produce and store in said digital memory of the computer a dataset of M points, where M=m·N or m·(N−1)+1, in accordance with the method defined in claim 2.

10. An image interpolator comprising a computer configured to process an input multidimensional dataset comprising a block of data of size N stored in a digital memory of the computer so as to provide an interpolation of the data stored therein to produce and store in said digital memory of the computer a dataset of M points, where M=m·N or m·(N−1)+1, in accordance with the method defined in claim 3.

11. An image interpolator comprising a computer configured to process an input multidimensional dataset comprising a block of data of size N stored in a digital memory of the computer so as to provide an interpolation of the data stored therein to produce and store in said digital memory of the computer a dataset of M points, where M=m·N or m·(N−1)+1, in accordance with the method defined in claim 4.

12. An image interpolator comprising a computer configured to process an input multidimensional dataset comprising a block of data of size N stored in a digital memory of the computer so as to provide an interpolation of the data stored therein to produce and store in said digital memory of the computer a dataset of M points, where M=m·N or m·(N−1)+1, in accordance with the method defined in claim 5.

13. An image interpolator comprising a computer configured to process an input multidimensional dataset comprising a block of data of size N stored in a digital memory of the computer so as to provide an interpolation of the data stored therein to produce and store in said digital memory of the computer a dataset of M points, where M=m·N or m·(N−1)+1, in accordance with the method defined in claim 6.

14. An image interpolator comprising a computer configured to process an input multidimensional dataset comprising a block of data of size N stored in a digital memory of the computer so as to provide an interpolation of the data stored therein to produce and store in said digital memory of the computer a dataset of M points, where M=m·N or m·(N−1)+1, in accordance with the method defined in claim 7.

* * * * *